(12) United States Patent
Kormendy et al.

(10) Patent No.: US 6,483,693 B2
(45) Date of Patent: Nov. 19, 2002

(54) CENTER MOLDED CAPACITOR

(75) Inventors: Tibor Kormendy; Michel J. Richard; John Y. Cadwallader, all of Kennebunk, ME (US); Kyle E. Clark, Milford, CT (US)

(73) Assignee: Vishay Sprague, Inc., Sanford, ME (US)

( * ) Notice: Subject to any disclaimer, the term of this patent is extended or adjusted under 35 U.S.C. 154(b) by 0 days.

(21) Appl. No.: 09/809,477

(22) Filed: Mar. 15, 2001

(65) Prior Publication Data

US 2002/0048146 A1 Apr. 25, 2002

Related U.S. Application Data

(62) Division of application No. 09/576,825, filed on May 23, 2000, now Pat. No. 6,284,555.

(51) Int. Cl.[7] .................................. H01G 9/04
(52) U.S. Cl. ...................... 361/516; 361/508; 361/510; 361/532
(58) Field of Search ................. 361/508, 509, 361/510, 516, 517, 518, 519, 528, 529, 532, 533, 536–539

(56) References Cited

U.S. PATENT DOCUMENTS

| | | | |
|---|---|---|---|
| 3,828,227 A | * 8/1974 | Millard et al. | 257/702 |
| 4,064,611 A | * 12/1977 | Sobozenski et al. | 29/25.03 |
| 4,538,212 A | * 8/1985 | Montgomery | 361/536 |
| 4,688,322 A | 8/1987 | Fossey | |
| 4,760,494 A | * 7/1988 | Crum | 361/272 |
| 5,043,849 A | * 8/1991 | Libby | 29/25.03 |
| 5,390,074 A | 2/1995 | Hasegawa et al. | |

FOREIGN PATENT DOCUMENTS

EP 0 538 651 A3 4/1993

OTHER PUBLICATIONS

Articl Title: Tantalum breakthrough doubles chip capacitance. Author: Panasonic Matsushita Electric of Canada no date.

Title: Tantamount High CV, Sub–minature Molded Solid Tantalum Chip Capacitor. Author: Sprague Electric No date.

Title: Small Size Chip Tantalum Solid Electrolytic Capcitor Author: Japanese No date.

* cited by examiner

Primary Examiner—Anthony Dinkins
(74) Attorney, Agent, or Firm—McKee, Voorhees & Sease, P.L.C.

(57) ABSTRACT

A first mold die and a second mold die are moved together and are shaped to define a mold cavity therebetween. A capacitor pellet is positioned within the mold cavity and a plurality of projections extend inwardly to engage the capacitor pellet and hold it spaced away from the cavity side wall.

5 Claims, 7 Drawing Sheets

CENTER MOLDED CAPACITOR

CROSS REFERENCE TO A RELATED APPLICATION

This application is a division of Ser. No. 09/576,825 filed May 23, 2000 now U.S. Pat. No. 6,289,555.

BACKGROUND OF THE INVENTION

The present invention relates to a capacitor mold and method for using same.

In the molding of pellet capacitors, difficulty is often encountered in trying to center the capacitor pellet within the mold during molding. Failure to properly center the capacitor in the mold results in thin layers or bare spots in the protective coating that surrounds the pellet.

Therefore, a primary object of the present invention is the provision of an improved capacitor mold and method for using same.

A further object of the present invention is the provision of a capacitor mold and method for using same which centers the capacitor pellet within the mold and holds the capacitor pellet in this centered position during the molding process.

A further object of the present invention is the provision of a capacitor mold and method for using same which results in a protective coating having uniform thickness around the side walls of the pellet.

A further object of the present invention is the provision of a mold and method for using same which is economical in manufacture, durable in use, and efficient in operation.

SUMMARY OF THE INVENTION

The foregoing objects may be achieved by a combination including first and second mold dies. The two dies are movable together and are shaped to define a mold cavity therebetween. The mold cavity has a cavity anode end, a cavity cathode end, a longitudinal axis extending between the cavity anode and cathode ends, and a cavity side wall surrounding the longitudinal axis and extending between the cavity anode and cathode ends. A capacitor pellet includes an anode pellet end, a cathode pellet end and a pellet body extending therebetween. A plurality of projections extend inwardly from the cavity side wall. The projections engage the pellet body and hold the pellet body spaced away from the cavity side wall.

According to one feature of the invention the cavity side wall includes a plurality of surfaces, and at least one of the projections extends from each of the surfaces toward the longitudinal axis of the pellet.

According to another feature of the invention each of the projections is positioned adjacent the cathode end of the cavity and engages the pellet body adjacent the cathode pellet end.

According to a preferred embodiment of the invention a plurality the surfaces on the side wall comprise four surfaces.

According to a further feature of the invention the plurality of projections approximately center the pellet body within the cavity side wall so as to create a substantially uniform space between the pellet body and the cavity side wall.

According to a further feature of the invention the coating of conductive material covers the cathode pellet end and a portion of the pellet body adjacent the cathode pellet end. All of the projections engage the conductive material.

According to the method of the present invention the pellet body is placed within a molding cavity having an anode cavity end, a cathode cavity end, and a cavity side wall extending therebetween. The pellet body is retentively engaged within the cavity by a plurality of projections which extend from the cavity side wall and engage the pellet body to provide a space between the pellet body and the cavity side wall. The space extends completely around the pellet body. A molding material is used to fill the space to provide a coating on the pellet body.

DETAILED DESCRIPTION OF THE PREFFERED EMBODIMENT

Figure 1:
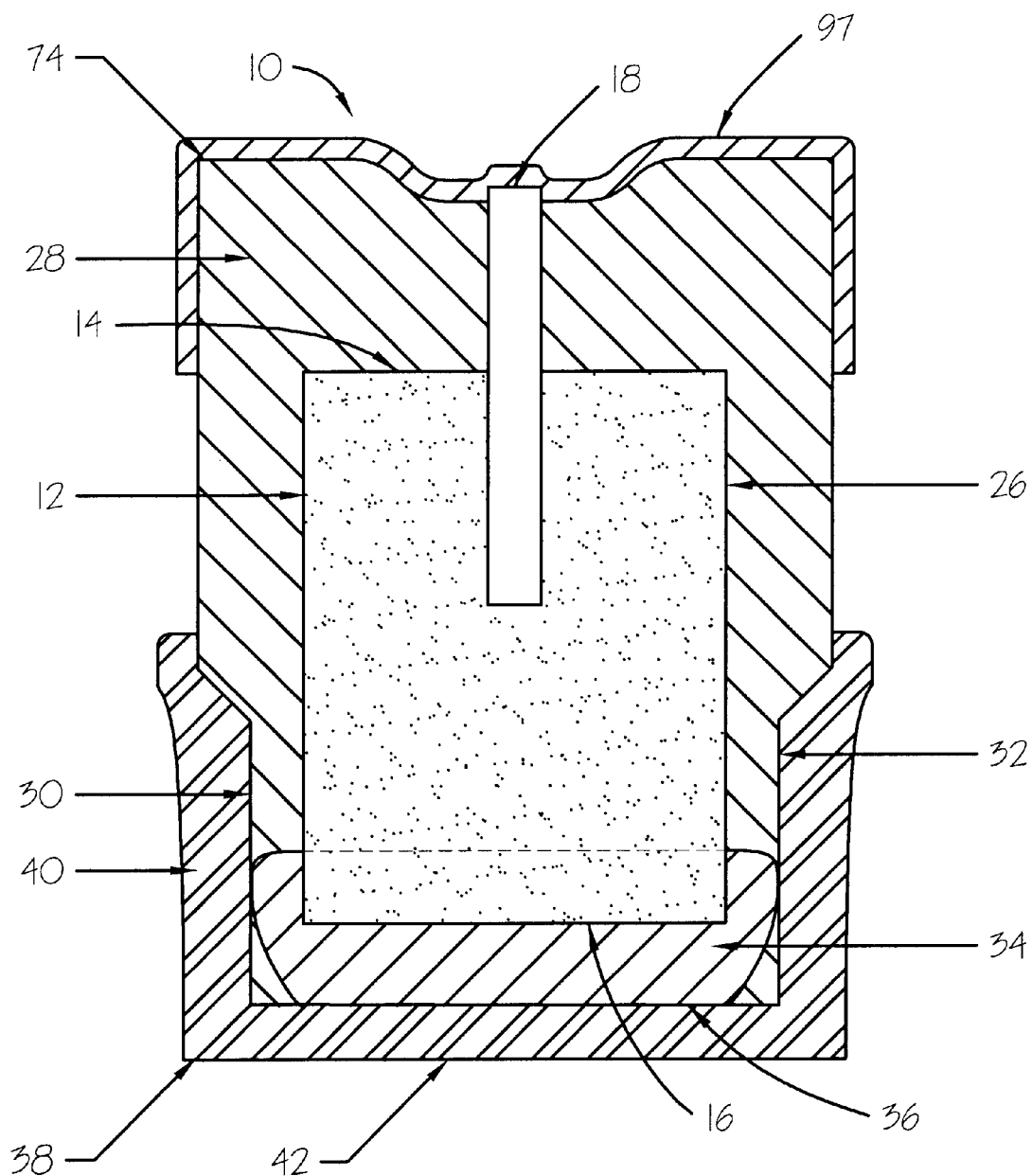
FIG. 1 is a sectional view of a capacitor made according to the present invention.

Referring to FIG. 1 the numeral 10 generally designates a capacitor made according to the present invention. Capacitor 10 includes a pellet 12 having an anode pellet end 14, and a cathode pellet end 16. An anode wire 18 is embedded in and extends from the anode pellet end 14 of pellet 12. Pellet 12 also includes a pellet front wall 20 (FIG. 5), a pellet rear wall 22, and opposite pellet side walls 24, 26. Surrounding the pellet 12 is a protective body 28 made of molded material which protects the integrity of the pellet 12. Numerous molding materials have been used, and they are preferably dielectric. However, persons skilled in the art may select a wide variety of protective molded materials without detracting from the invention. The preferred molding compound is manufactured by Dexter Corporation, at 211 Franklin Street, Olean, N.Y. 14760, under model number MG 53 F.

The protective body 28 includes a pair of opposite side indentations 30, 32. Other side indentations are also formed in the protective body 28 and will be described hereafter. Surrounding the bottom of the pellet 12 is a cathode termination 34 made of a conductive material which may be silver, other metals, or conductive epoxy. A wide variety of these conductive materials are available and are used in the industry. The preferred conductive material for use in the present invention is a conductive epoxy sold under the Model No. 61445, by Metech, Inc., having an address of Rt. 401, Box 360, Elverson, Pa. 19520. The cathode termination 34 includes a downwardly presented cathode termination surface 36 which engages a cathode terminal cap 38 made of conductive material. Cathode cap 38 includes cap side walls 40 and a cap end wall 42. The wire 18 provides the anode termination for capacitor 10. A conductive anode cap 97 can be provided at the anode and so as to engage the wire 18 and provide an anode terminal for capacitor 10.

Figure 2:
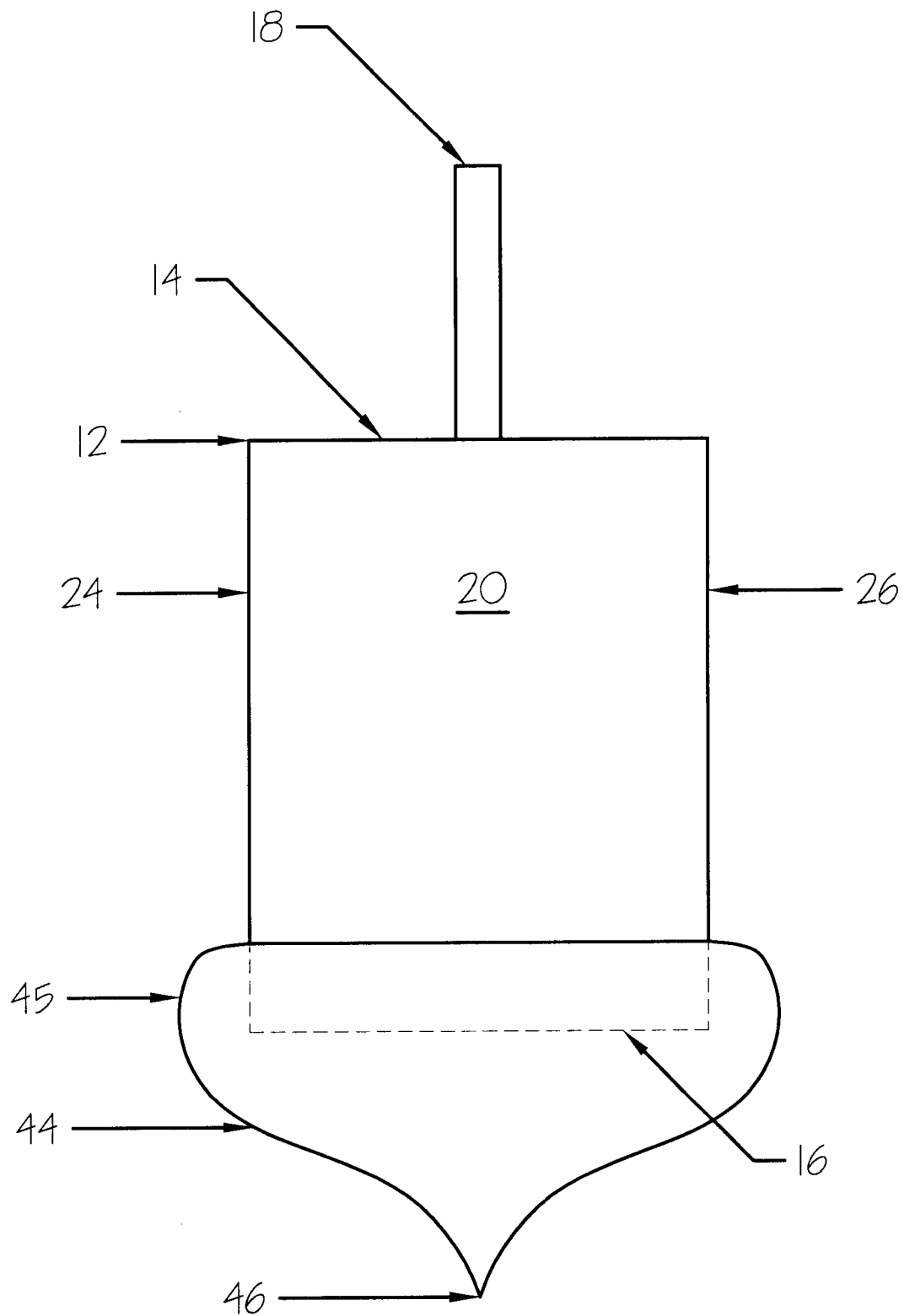
FIG. 2 is an elevational view showing the pellet, wire, and teardrop body of the present invention.
Figure 3:
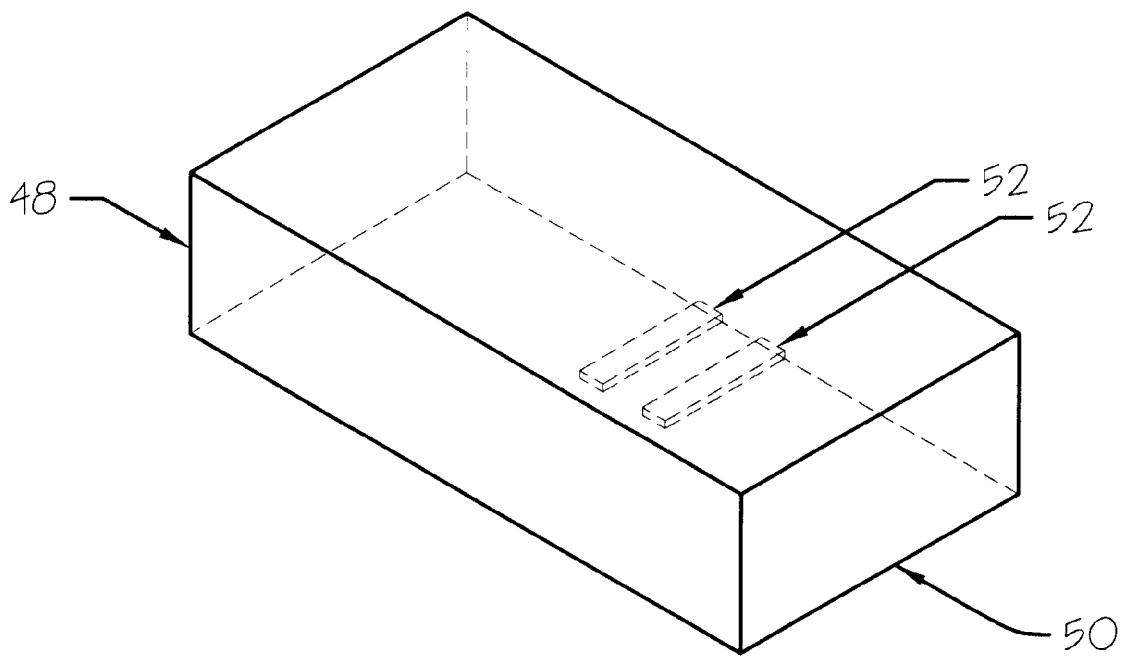
FIG. 3 is a simplified and partial semetric view of the molds used to produce the capacitor of the present invention.
Figure 3:
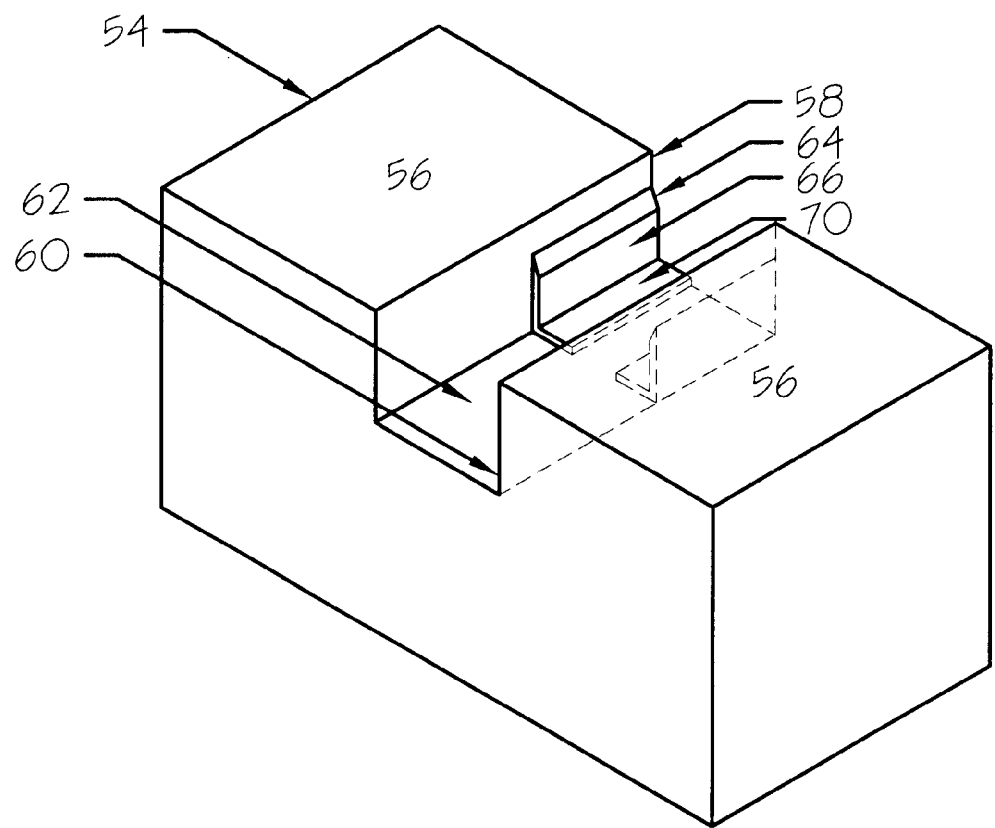

Referring to FIG. 2, the pellet 12 is shown in its form before being placed in the mold. Pellet 12 is formed by conventional press molding and sintering technique which are well known in the art. The pellet 12 is covered at its cathode end 16 by a tear drop shaped body 44 made of the above identified conductive material. Body 44 includes an upper portion 45 which surrounds the front, side and rear walls of the pellet 12 adjacent the cathode end thereof. Tear drop shaped body 44 also includes a tear drop point 46. In some cases there are multiple tear drop points 46.

The formation of tear drop shaped body 44 on the cathode end 16 of pellet 12 is accomplished by dipping pellet 12 into a reservoir of fluid hardenable conductive material, or alternatively by using a syringe. After application the conductive material is permitted to cure and harden.

The pellet 12 shown in FIG. 2 is positioned within a molding cavity formed by an upper mold 48 and a lower mold 54. Upper mold 48 includes an upper mold face 50 on its lower surface and a pair of spacing ribs 52 which protrude downwardly therefrom. Bottom mold 54 includes a bottom mold face 56 which faces upwardly. Cavity side walls 58, 60 and a cavity bottom wall 62 combine with the upper mold face 50 to form a molding cavity as shown in FIG. 5.

A pair of L-shaped spacers 64 are positioned with upstanding legs 66 extending along the cavity side walls 58, 60 and with horizontal legs 70 extending along the cavity bottom wall 62. The upper edges of upstanding legs 66 are each provided with a tapered edge 68 (FIG. 5).

Figure 4:
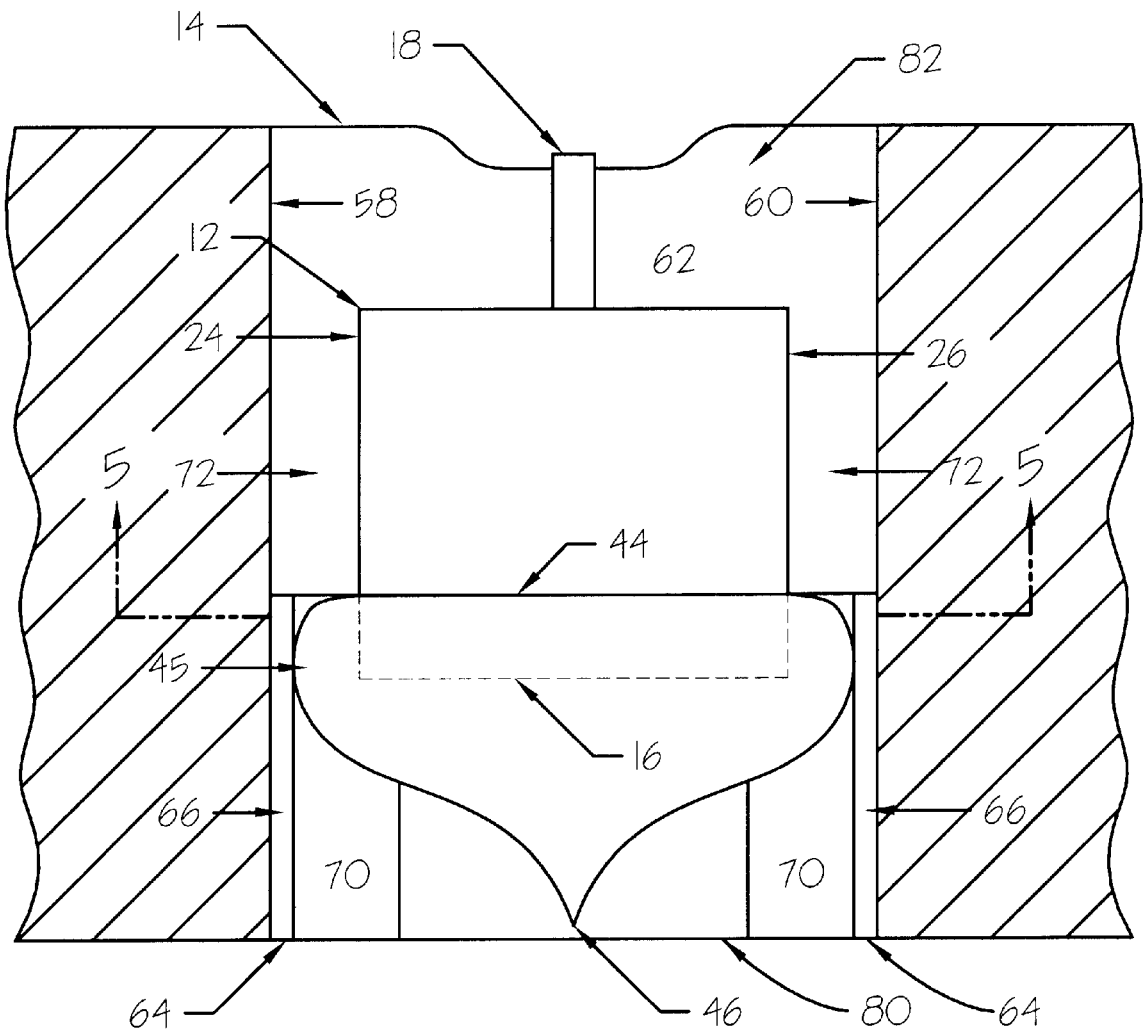
FIG. 4 is a top plan view of the pellet positioned within the bottom mold member.
Figure 5:
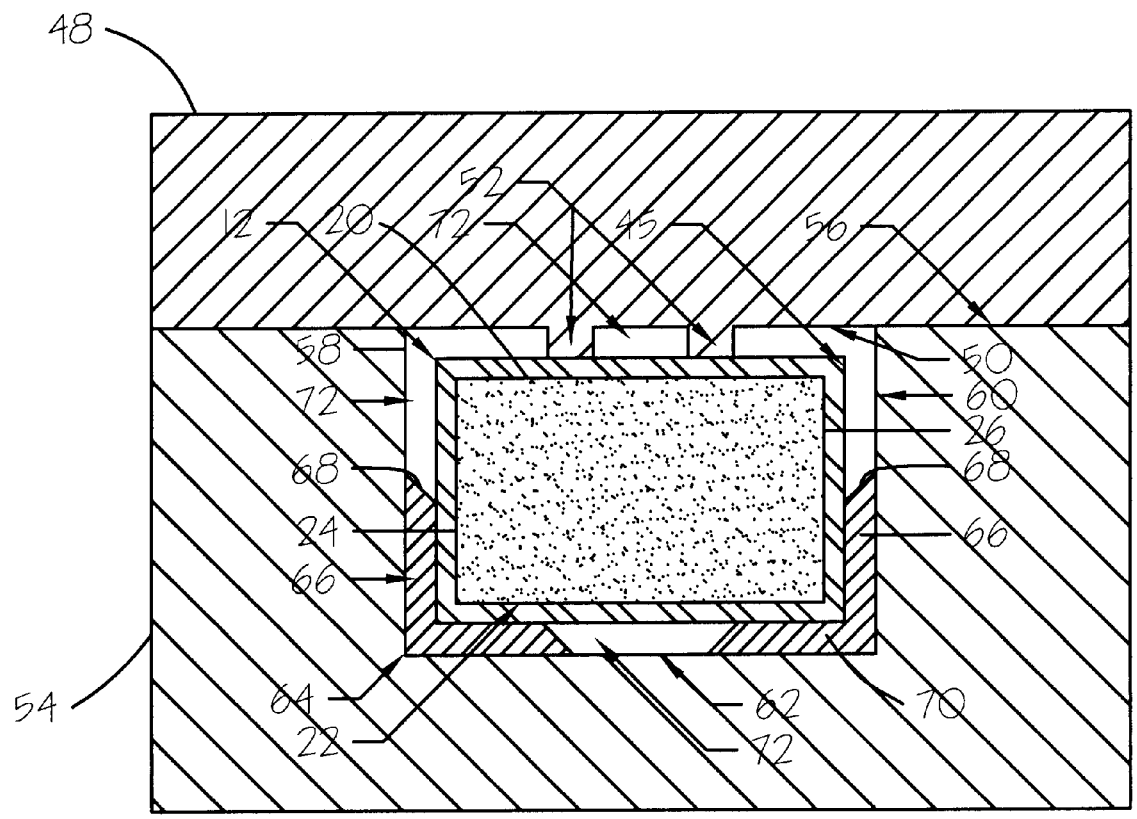
FIG. 5 is a sectional view taken along line 5—5 of FIG. 4.

FIGS. 4 and 5 show the pellet 12 positioned within the mold. In this position the L-shaped members 64 extend from the cathode end 80 of the cavity toward the anode end 82 of the cavity, and terminate at a point spaced from but adjacent the cathode end 16 of the pellet 12 as can be seen in FIG. 4. The ribs 52 of the upper mold 48 extend longitudinally approximately the same distance from the anode end 80 of the cavity. As can be seen in both FIGS. 4 and 5 a substantially uniform space 72 is formed around all four sides of the pellet 12. The L-shaped pieces 64 and the ribs 52 engage the anode end of the pellet, and specifically engage the tear shaped body 44 to center the pellet 12 within the cavity. While the ribs 52 and the L-shaped members 64 are used to center the pellet 12 within the cavity, other shapes and configurations of projections could accomplish the same result without detracting from the invention. The importance of centering the pellet 12 within the cavity is that when the molding process is complete there is a layer of protective material surrounding the pellet, and that layer of protective material is of substantially uniform thickness.

Figure 6:
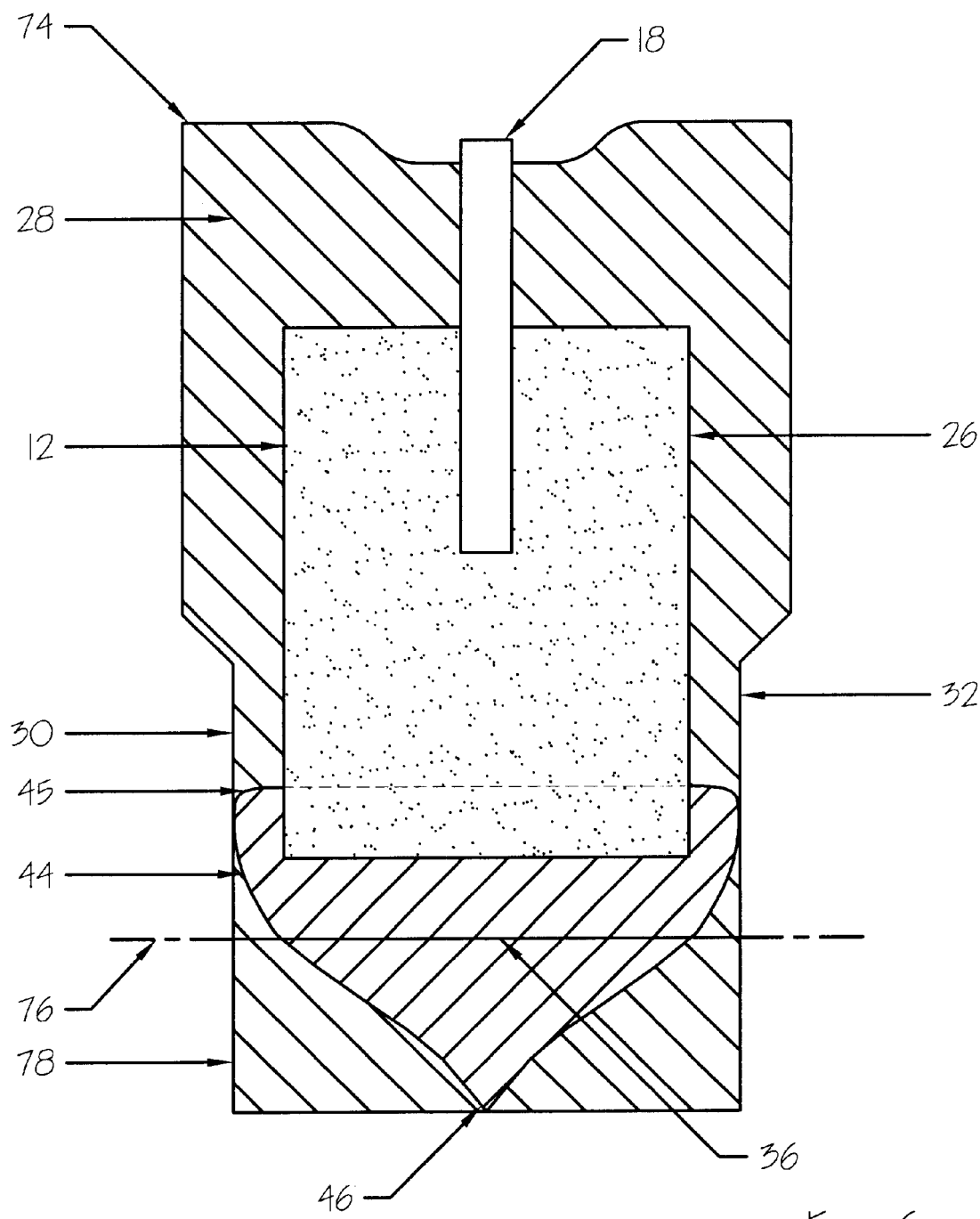
FIG. 6 is a sectional view of the molded capacitor before the bottom portion thereof is removed.

FIG. 6 shows the completed molded uncut capacitor body designated by the numeral 74. This capacitor body 74 is cut along a cut line 76 to remove a lower body portion 78 and to expose the cathode termination surface 36 that can be engaged by the terminal cap 38 as shown in FIG. 1.

The removal of the removed body portion 78 can be accomplished by cutting, grinding or other conventionally known means.

The completed capacitor 10 has a cathode termination surface 36 which is flat and which faces axially away from the cathode end of the pellet. It is also centered with respect to longitudinal axis of the pellet. This centering is accomplished by the molding process which utilizes the projections 52, 64 to center the pellet and the tear dropped shaped body 44 within the mold cavity.

Figure 7:
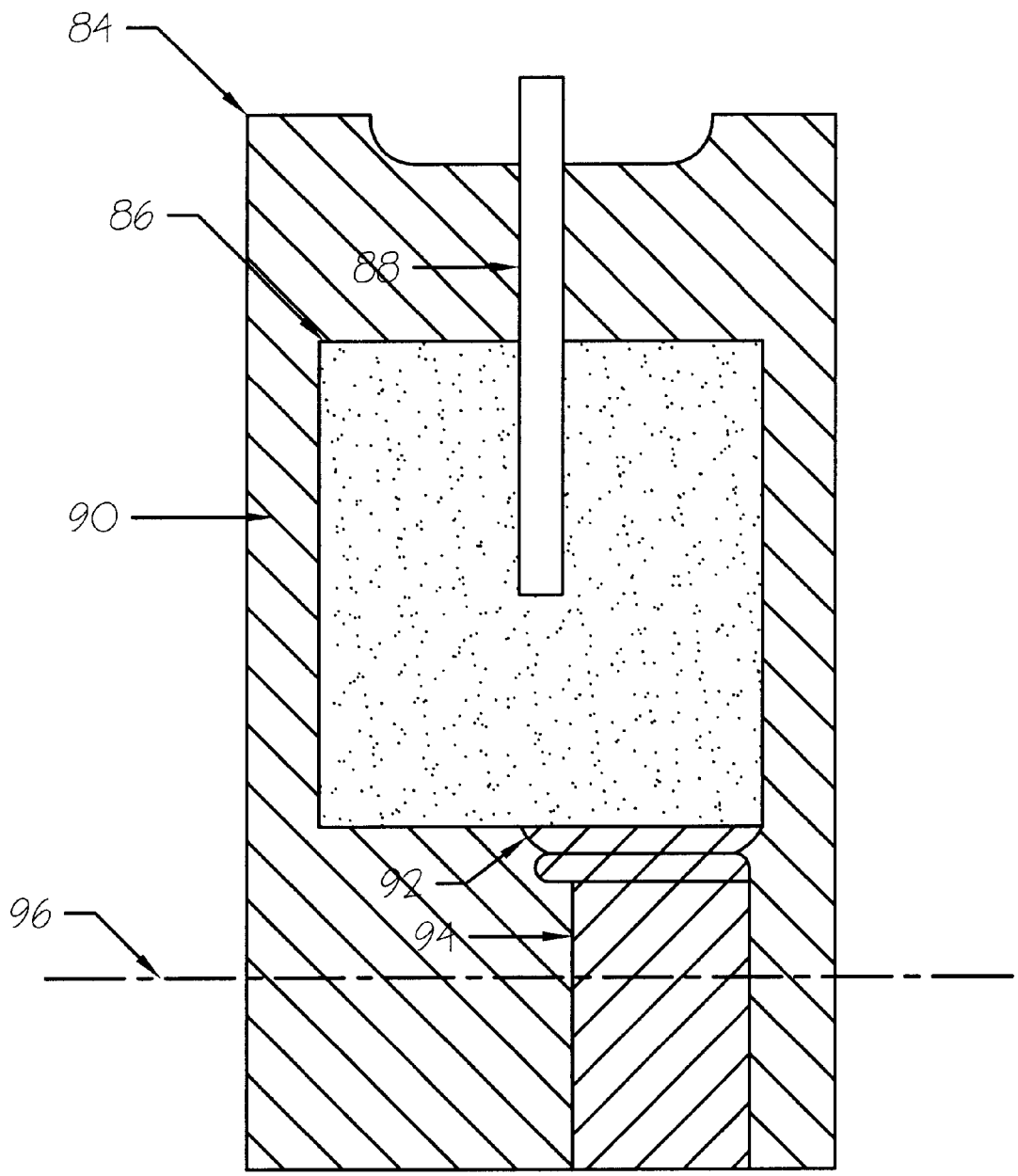
FIG. 7 is a view similar to FIG. 6, but showing a prior art capacitor.

FIG. 7 illustrates a prior art capacitor 84 made according to a prior art method for creating the cathode termination. The capacitor 84 includes a pellet 86 and an anode wire 88. A protective body 90 is molded around the pellet 86. At the cathode end of the pellet 86 is a conductive adhesive 92 which attaches a silver pin 94 to the pellet 86. A cut is made along cut line 96 and this cut exposes the silver pin 94 to create the cathode termination surface.

Neither the conductive adhesive 92 nor the silver pin 94 can be used as a means for centering the pellet 86 in the molded body 90. Without the use of the tear drop shaped body, this process is very difficult to center the pellet 86 in the molded body 90. Failure to properly center the pellet 86 can result in thin spots or even openings in the protective coating 90. In contrast the use of the tear drop shaped body 44 and the use of the projections 64, 52 to center the body within the mold cavity creates a termination which is centered with respect to the longitudinal access of the pellet, and which has a protective coating 28 of uniform thickness around the side wall of pellet 12.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A capacitor comprising:
    a capacitor pellet having an anode end, a cathode end, a front face, a rear face, first and second opposite sides, and a longitudinal pellet axis extending from said cathode end to said anode end;
    an anode wire connected to and in contact with said pellet and extending outwardly from said anode end of said pellet;
    a quantity of conductive material in electrical contact with said cathode end of said capacitor pellet;
    a molded material covering said pellet with a uniform thickness and also covering a portion of said conductive material;
    said conductive material being uncovered by said molded material to create an exposed cathode termination at said cathode end of said pellet, said cathode termination being approximately centered on said longitudinal axis of said pellet and facing axially away from said cathode end of said pellet;
    a cathode terminal covering said cathode end of said pellet and being in electrical contact with said cathode termination.

2. A capacitor according to claim 1 wherein said quantity of conductive material surrounds and contacts said front face, said rear face, and said first and second opposite sides of said pellet adjacent said cathode end of said pellet.

3. A capacitor comprising:
    a capacitor pellet having a pellet anode end, a pellet cathode end, a pellet front wall, a pellet rear wall, and first and second opposite pellet side walls;
    an anode wire in electrical connection with said capacitor pellet and extending from said anode end of said pellet;
    a conductive material surrounding and being in electrical contact with said pellet cathode end and at portions of said pellet front, rear, and first and second side walls adjacent said pellet cathode end;
    a molded material surrounding and covering said capacitor pellet and leaving an exposed portion of said conductive material uncovered to form a cathode termination, said molded material surrounding and covering a covered portion of said conductive material.

4. A capacitor according to claim 3 wherein said covered portion of said conductive material is on said pellet front, rear, and first and second side walls, and said uncovered portion of said conductive material is on said pellet cathode end and faces axially away from said pellet cathode end.

5. A capacitor comprising:

a capacitor pellet having an anode end, a cathode end, a front face, a rear face, first anf second opposite sides, and a longitudinal pellet axis extending from said cathode end to said anode end;

an anode wire connected to and in contact with said pellet and extending outwardly from said anode end of said pellet;

a conductive body surrounding said cathode end and portions of said front face, rear face, and first and second opposite sides of said pellet adjacent said cathode end;

a molded material covering said pellet with a uniform thickness and also covering a portion of said conductive body, said molded material leaving said conductive body uncovered at an exposed cathode termination facing axially away from said anode end of said pellet and also leaving said conductive body uncovered at exposed parts of said conductive body surrounding said front, rear, and first and second sides of said pellet;

a cathode terminal covering said cathode pellet end and being in contact with said cathode termination and said exposed parts of said conductive body surrounding said front, rear, and first and second sides of said pellet.

* * * * *